United States Patent [19]

Weis

[11] 4,283,116

[45] Aug. 11, 1981

[54] BEAM COMBINER

[75] Inventor: John A. Weis, Kennewick, Wash.

[73] Assignee: Jersey Nuclear-Avco Isotopes, Inc., Bellevue, Wash.

[21] Appl. No.: 35,223

[22] Filed: May 2, 1979

Related U.S. Application Data

[63] Continuation of Ser. No. 790,017, Apr. 22, 1977, abandoned.

[51] Int. Cl.$^3$ .............................................. G02B 27/14
[52] U.S. Cl. .................................................. 350/174
[58] Field of Search ............... 350/174, 171, 169, 285, 350/6.9

[56] References Cited

U.S. PATENT DOCUMENTS 3,310,753  3/1967  Burkhalter ...................... 331/94.5 Q Primary Examiner—Jon W. Henry
Attorney, Agent, or Firm—Weingarten, Maxham & Schurgin

[57] ABSTRACT

An optical commutation system for commutating pulsed radiation between a common path of relatively high pulse rate and plural, closed spaced, slowly diverging paths on which the pulses are distributed. The system may thus act as a combiner or decombiner. The system employs a reflective or refractive optical element which is driven to produce a very slight oscillation in the orientation of the refractive or reflective surface of the element typically ranging over only a few degrees. The angle of oscillation is kept as small as possible, being only large enough to resolve or separate the radiation pulses on the slowly diverging paths. The very slight angular variation between adjacent ones of the diverging paths permits a large number of beams to be packed together in the bundle of diverging paths, but because of the slight angular variation, only a small angular scan resulting from the finite pulse duration is experienced. This can be kept well within acceptable limits for use with long path lengths.

37 Claims, 7 Drawing Figures

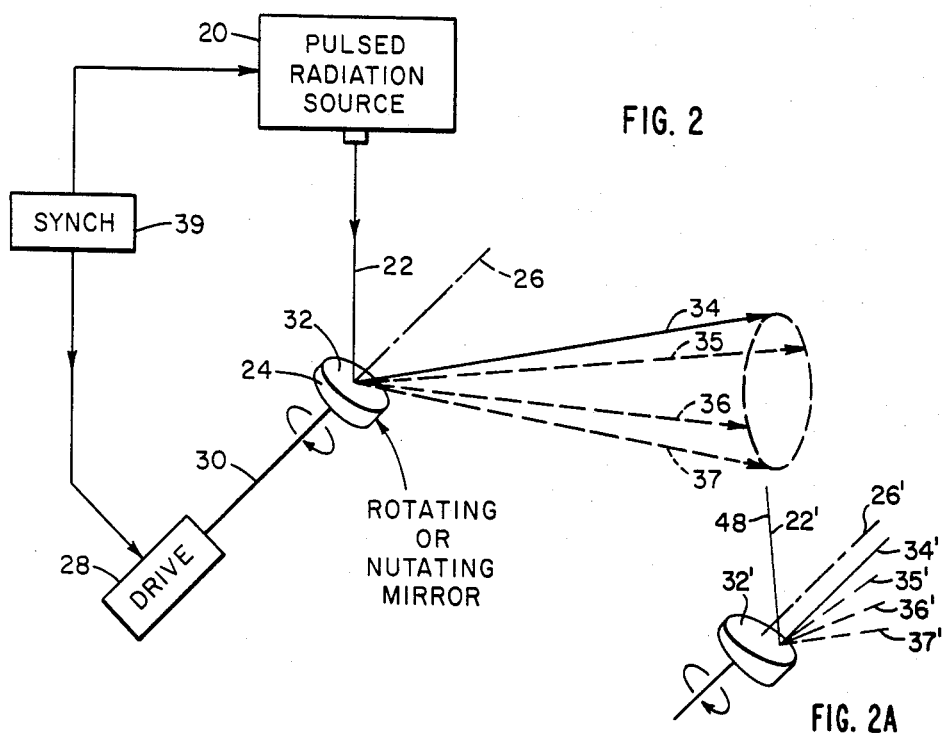
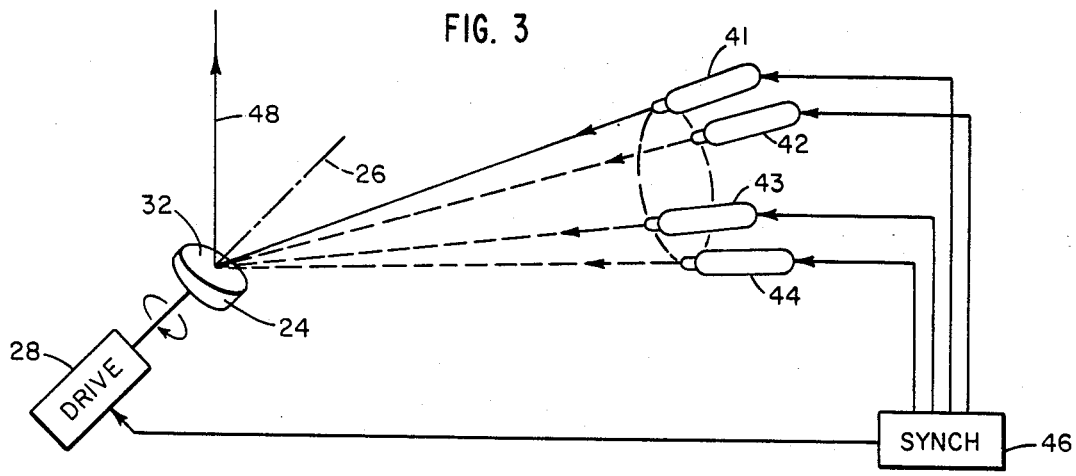
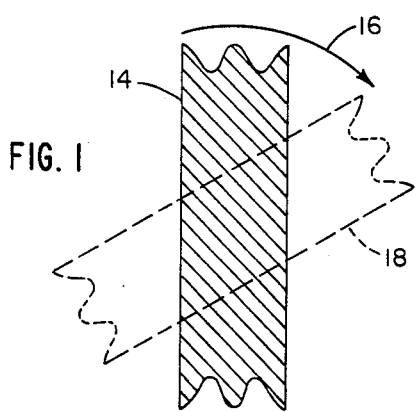
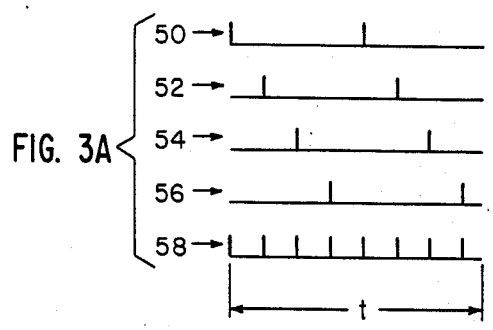

BEAM COMBINER

This is a continuation of application Ser. No. 790,017, filed Apr. 22, 1977 now abandoned.

FIELD OF THE INVENTION

This invention relates to systems for combining separate beams of electromagnetic radiation pulses into a single beam of radiation pulses and for splitting single beams of radiation pulses into a plurality of separate beams of radiation pulses, and in particular to a system wherein the dynamic angular variation in the radiation pulses of the output beams is made very small.

BACKGROUND OF THE INVENTION

In systems employing pulsed laser radiation, it is often desirable to employ a higher repetition rate for the pulsed laser radiation than is commonly available from a single component laser. Techniques, frequently employing rotating optics, are known which permit the sequential combination of pulsed laser radiation beams into a single, common axial beam. These and related techniques are represented by U.S. Pat. Nos. 3,543,183; 3,310,753; 3,541,468; 3,568,087; and 3,924,937.

In one application of high pulse rate laser radiation, isotope separation is accomplished by isotopically selective laser photoionization in a high flow rate environment of plural isotope types. The high flow rate necessitates a high pulse rate if the entire environment is to be illuminated as desired for efficiency. Such high rates normally are obtainable only by combining beams from several lasers. An example of such a use is described in U.S. Pat. No. 3,924,937.

For such an application of laser isotope separation, it is typical to find laser beam paths which extend over substantial distances and therefore require a precise and nonvarying angular orientation and superposition of several different laser beams. For example, it is often desirable to employ one laser oscillator having a precisely determined frequency, called the local oscillator, to control the frequencies of several injection-locked laser oscillators which are often high power devices which cannot operate at the high repetition rate of the local oscillator. Laser pulse durations are typically in the range of a substantial fraction of a microsecond for this use. Where rotating optics are employed to receive each sequential pulse from several lasers in order to combine them at a unitary path, the angular motion of these optics frequently results in motion of the combined laser beams over the pulse duration. This motion may appear as a beam deflection as well as a rotation of the plane of deflection from pulse to pulse. In applications of laser isotope separation which require the consistent illumination of a predetermined channel throughout the environment of isotopes to be separated, such angular motion of the radiation is to be avoided.

SUMMARY OF THE INVENTION

In accordance with the preferred embodiment of the present invention, a system is described for splitting a single beam of pulsed electromagnetic radiation into several closely spaced, slowly diverging beams or for combining two or more sequentially pulsed beams placed on slowly converging paths into one beam. In splitting a single beam into several beams, collimated, pulsed electromagnetic radiation from a laser or other source is directed toward a rotating or nutating mirror whose surface is only slightly inclined with respect to a plane perpendicular to the axis of rotation or nutation, such that the reflective surface has the effect of nutating about the axis. The rotating or nutating mirror distributes the one collimated input beam consisting of a series of pulses into a number of output beams closely spaced about a conical surface of very acute angle. By thus limiting the angle between successive output beams to an angle just slightly above that necessary to achieve separation, the angular motion of each output beam during a pulse is kept acceptably small.

In combining two or more beams into a single beam, the system operates in the reverse manner. Several collimated beams of electromagnetic radiation pulses having the proper direction and location are applied to the rotating or nutating mirror, resulting in a single output beam of collimated electromagnetic radiation pulses.

An alternate embodiment is described for splitting and combining beams of electromagnetic radiation pulses in which a single input (or output) beam is applied to (or exits from) a first surface of a rotating refractory prism. The plurality of output (or input) beams exit (or enter) a second surface of the rotating prism which is slightly inclined with respect to the first surface, such that the single input (output) beam is split (a combined beam).

DESCRIPTION OF THE DRAWINGS

These and other features of the present invention are more fully set forth below in the exemplary and nonlimiting detailed description of the preferred embodiment and in the accompanying figures, in which:

FIG. 1 illustrates the effects of rotation of a typical laser power amplifier output beam;

FIG. 2 shows schematically one application of the invention for splitting a single beam into several beams;

FIG. 3 shows schematically an alternate application of the invention for combining several beams into a single beam;

FIG. 3A is a timing diagram useful in explaining the operation of FIG. 3;

DETAILED DESCRIPTION OF THE PREFERRED EMBODIMENT

Figure 4:
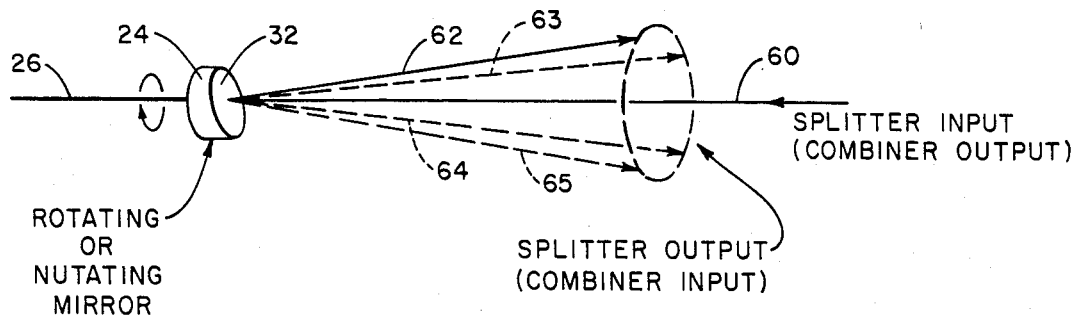
FIG. 4 shows another application of the invention in which it is used for splitting or combining beams of radiation.

In accordance with the present invention described herein, a system is described for increasing the effective pulse rate of a pulsed laser system by combining, in sequence, the output beams of a plurality of pulsed lasers into a common beam, the pulse rate of which is increased over the rate of each of the individual lasers. The system produces an output beam having a very small dynamic angular variation by placing the beams on closely spaced, slowly converging paths and deflecting them by means of an optical deflector which is thus required to change the deflection angle only slightly between beams to reduce them onto a common path. Dynamic angular variation or scanning is thus reduced to acceptable levels, avoiding the use of separate or cumbersome rotating optical systems for compensation of angular variation. While of particular utility in a laser system, the invention may be employed for combining any pulsed beams. Furthermore, the operation of the invention may be reversed to provide a system for splitting a single beam into a plurality of beams while retaining the above-mentioned advantages.

Referring to FIG. 1, there is shown a typical cross-section 14 of an output beam of radiation from a laser power amplifier. The output of such a laser power amplifier and of laser power amplifiers in general does not have a radially symmetric cross-section. While many systems exist for combining several laser beams to form a single laser beam having a higher average power, one common problem of these types of systems is that image rotation occurs in the combined output beam. This results in a significant rotational movement of the beam during an output pulse, as shown by arrow 16 and dotted cross-section 18. In view of the beam cross-sectional shape, this rotation greatly changes the illuminated region. This angular rotation creates further difficulty in adjusting the angular orientation of the individual laser amplifiers of a beam-combining system to produce an output beam whose cross-section and orientation is as constant as possible.

The cross-sectional shape and size of the beam illustrated will not remain constant, however, as it propagates over distances of tens of meters or more encountered in laser enrichment. The beam will diverge, and may diverge at different rates as a function of the angle about the line of propagation, by at least the diffraction limited minimum dependent upon beam size. Other factors, such as perturbations in the medium generating the beam, may contribute additional divergence. The beam illustrated in FIG. 1 will spread with distance approaching a circular or elliptical cross-section. Thus, if such a beam is to be split, the several beams into which it is split must diverge from each other at an angle greater than the divergence of each beam so that at a distance of practical dimensions, the beams are wholly separate and distinct.

In the case of either splitting or combining, the divergence property of the beam of interest provides an inherent limitation on beam quality. Thus, beam motion, resulting from the effects of combining or splitting optics motion, is acceptable if it is comparable, or preferably below, the inherent divergence. This permits the use of an optics system as is proposed in the present invention in which the beam motion, while present, is made controllably small within these guidelines.

Referring to FIG. 2, there is shown a diagram of apparatus according to the present invention as it would be used to split a single input beam of electromagnetic radiation pulses into a plurality of output beams of electromagnetic radiation pulses. Accordingly, a source of pulsed laser radiation 20 produces a collimated beam of electromagnetic radiation pulses 22. This beam of pulses 22 serves as the input beam of pulses to the system. Beam 22 impinges upon a mirror or other reflecting device 24. Mirror 24 is rotated about an axis 26 by a driving mechanism 28 connected to mirror 24 via a shaft 30 or other suitable means for rotating mirror 24.

The reflective top surface 32 of mirror 24 is preferably planar or nearly so in configuration, the flatness or regularity of surface 32 being important in reducing perturbations in the output beams therefrom, as will become apparent. The reflecting surface 32 is slightly inclined with respect to a plane perpendicular to the axis of rotation 26. In other words, the normal-to-surface 32 is slightly inclined with respect to axis 26 and will rotate around axis 26 describing a conical surface as mirror 24 is rotated by drive system 28. This causes the reflecting surface 32 of mirror 24 to possess the characteristics of nutation, a slight wobble. The mirror may also thus be driven without rotation in an actual wobble motion. For present purposes, this motion will be termed a nutation because it has that appearance.

As a result, the input beam 22 will be reflected by reflective surface 32 at different angles as the reflecting surface 32 rotates or nutates about axis 26. This is shown by output beams 34–37. If mirror 24 is oriented such that the inclination of reflecting surface 32 is angled toward input beam 22, as shown in FIG. 2, the output beam will be reflected at an angle as shown by output beam 34. As mirror 24 is rotated at a rate below the pulse rate of beam 22 by drive mechanism 28, each output beam will appear along different lines in a conical surface. The result is that if an input beam is composed of a series of individual pulses, the rotation of reflective surface 32, as described above, will cause these pulses to be reflected in different directions, as shown in FIG. 2.

Normally, a synchronizing circuit 39 is connected between pulsed radiation source 20 and driving mechanism 28 to coordinate the rotation of reflecting surface 32 with the individual pulses emitted by radiation source 20 so that the plural radiation pulses from radiation source occurring during a complete revolution of mirror 24 will occur at the same angular orientation of mirror 24 during each successive revolution thereof. This operation produces a selected number of separate output beams from reflecting surface 32, each beam being composed of selected pulses from radiation source 20, as determined by the angular orientation of mirror 24, and at a lower pulse rate.

The above-described operation of the apparatus in FIG. 2 is reversed to combine a plurality of input beams of pulsed radiation into a single output beam of pulsed radiation having a higher pulse repetition rate. The operation is more clearly shown by FIG. 3 wherein a plurality of pulsed lasers 41–44 each emits an output beam of laser radiation pulses. Pulsed lasers 41–44 may be replaced with other sources of pulsed electromagnetic radiation, including pulsed laser amplifiers driven from a single source of laser radiation. The output beams from pulsed lasers 41–44 lie on a conical surface, such that each beam impinges upon reflecting surface 32 at approximately the same point, perhaps the intersection of reflecting surface 32 with the axis of rotation 26. This intersection point allows the reflecting surface 32 to be the smallest possible for a given laser beam size. Intersection points displaced from the axis of rotation 26 may be preferred, especially in applications where it is important to keep the power density at the mirror surface 32 low. The angle of inclination of reflecting surface 32 with respect to a plane perpendicular to rotational axis 26 is determined by the arrangement and separation of the beams of pulsed radiation from pulsed lasers 41–44, as described below, but is generally as shallow as practical considerations permit. Synchronizing mechanism 46 is connected to pulsed lasers 41–44 and driving mechanism 28, such that each of the pulsed lasers emits a pulse at a time corresponding with the proper angular orientation of reflecting surface 32 to produce a single output beam 48 of pulsed laser radiation having a repetition rate and average power which is four times that of each of the individual lasers 41–44.

FIG. 3A shows the manner in which individual beams of pulsed radiation would be synchronized and combined by the apparatus of FIG. 3. In FIG. 3A, the pulses in waveform 50 denote output pulses from laser 41 of FIG. 3. Similarly, waveforms 52, 54, and 56 denote the output pulses from lasers 42, 43 and 44, respectively. The pulses from each of the pulsed lasers 41–44 are preferably evenly spaced in time and correspondingly synchronized with the rotation of reflecting surface 32 by synchronizing circuit 46. The result is an output beam of pulsed radiation 48 which is represented by the waveform 58, the output beam being increased in repetition rate and average power by a factor corresponding to the number of individual beams from lasers 41–44.

The angle of inclination of reflecting surface 32 with respect to axis 26 determines the amount by which the beams are or may be separated at a given distance T from the reflecting surface 32. The equations governing the optical geometry of both the beam splitter shown in FIG. 2 and the beam combiner shown in FIG. 3 are identical. Greater inclination angles give greater separation, and the amount of inclination also determines the rotational angle change during a given pulse time of the output beam. Greater inclination angles cause greater rotational angle changes. For a system whose input-/output beams are distributed around a circle of diameter d at a distance T from the reflecting surface, the angle of inclination $\alpha$ of reflecting surface 32 with respect to the axis of rotation 26 is given by:

$$\alpha = d/4t$$

The inclination $\alpha$ is to be kept very small, a small fraction of a radian being essential. An angle of one degree or less is a practical angle for use in laser enrichment systems. The angle is normally made as small as possible so that the rotational angle change during a given pulse time is negligible.

For practical applications, the pulse time $t_p$ will be very small compared to the time $t_r$ for one revolution of the mirror. The change in the angle $\Delta\theta$ of the output beam during one pulse will be small and is given by:

$$\Delta\theta = \frac{\pi D t_p}{T t_r}$$

From this, the angle change per unit of time $$\frac{\Delta\theta}{\Delta t}$$

can be determined to be:

$$\frac{\Delta\theta}{\Delta t} = \frac{NRD}{T}$$

where N is the number of beams to be combined, R is the angular velocity of the mirror in revolutions per second, D is the distance between centers of adjacent beams at a distance T from the mirror. For example, typical parameters would be N=80 beams, R=500 rps, D=1 cm, T=3000 cm, and $\Delta t=1$ microsecond. Then, the change in angle over one pulse may be calculated as:

$$\Delta\theta = 13.33 \text{ microradians}$$

Figure 5:
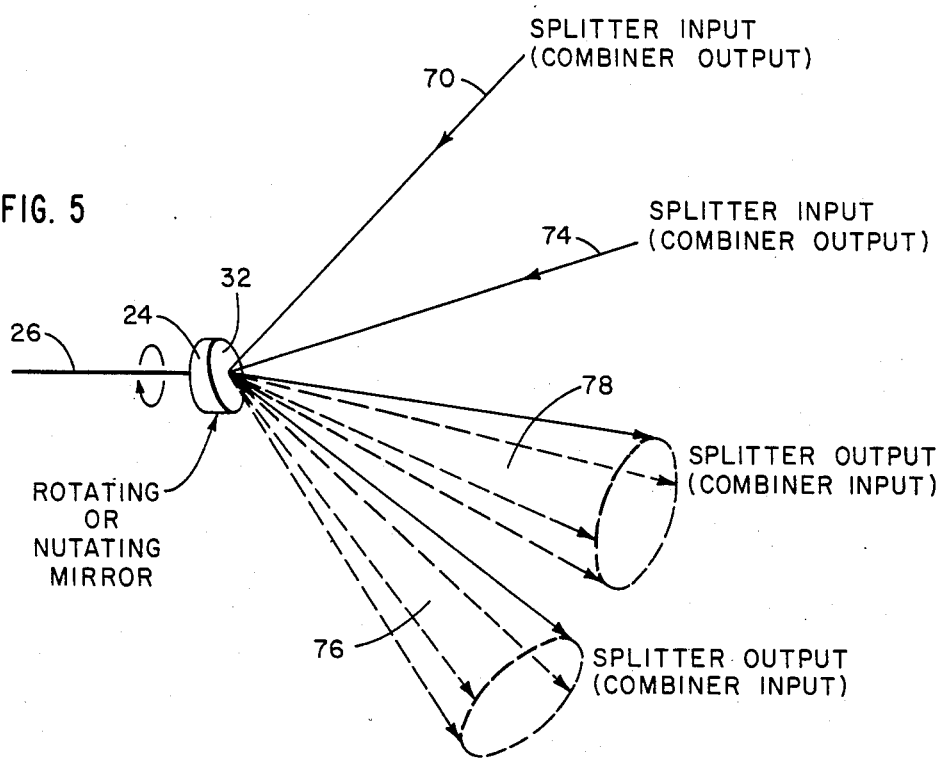
FIG. 5 shows another application of the invention in which it is used to split a plurality of beams or combine a plurality of beams of radiation.
Figure 6:
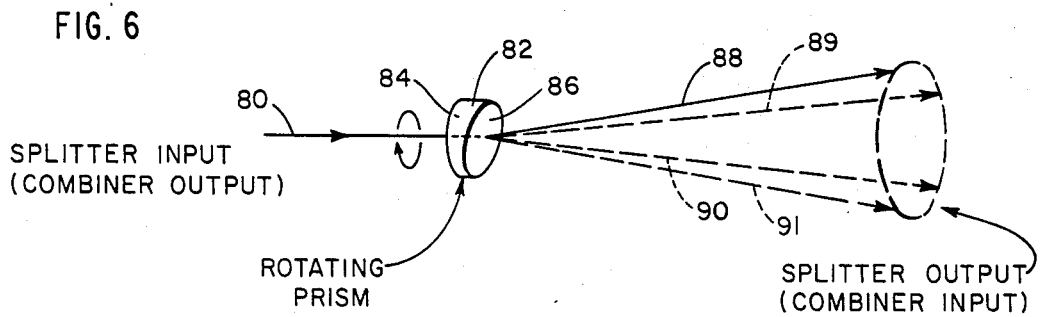
FIG. 6 shows another embodiment of the invention which may be used for splitting or combining beams of radiation.

FIGS. 4, 5 and 6 show alternate preferred embodiments of the invention. The input beam to be split or the combined output beam may have any convenient angle with respect to the mirror rotation axis. In FIG. 4, the splitter input beam or output beam 60 is parallel to the rotational axis 26 of mirror 24. In this case, the separate beams 62–65, forming the split output or separate inputs, are distributed along a conical surface whose axis is colinear with the single beam 60 and the rotational axis 26.

More than one beam may be split, and more than one set of beams may be combined simultaneously by the same rotating mirror. This operation is illustrated in FIG. 5. A first input beam to be split, or combined output beam, 70, impinges upon or is emitted from reflecting surface 32 at a first angle. A second input beam to be split, or combined output beam, 74, is directed at or reflected from reflecting surface 32 at a second, different angle. A corresponding conical distribution of separate beams 76, which may be splitter output beams or input beams to be combined, is located with respect to the corresponding input beam 70 and reflecting surface 32, as shown in FIG. 5. Similarly, a conical distribution of input or output beams 78 associated with single output/input beam 74 is located along a different conical path resulting from the different angle of single beam 74 with respect to rotational axis 26.

It should be appreciated that more than the two splitter/combiner systems shown in FIG. 5 may be associated with a single rotating reflective surface, and that both splitting and combining of beams of pulsed radiation may be performed by the same apparatus.

FIG. 6 shows an alternate embodiment of the invention in which a rotating, refracting element, such as a prism, is used to split or combine the single and separate beams. Accordingly, in splitting a single beam of pulsed electromagnetic radiation into several individual beams of pulsed electromagnetic radiation, an input beam 80 is directed at a rotating prism 82. In the embodiment shown in FIG. 6, the input beam 80 is colinear with the axis about which rotating prism 82 revolves. Input beam 80 enters prism 82 at surface 84, which surface is shown, but not necessarily, perpendicular to the input beam 80 and to the axis of rotation. The input beam then passes through the prism 82 and emerges therefrom at surface 86. Surface 86 is angled slightly with respect to surface 84. The result of the prism wedge angle is that the angle at which the input beam 80 will be emitted from prism 82 is slightly different from its input angle. As prism 82 rotates, the output beams are distributed about a conical surface whose axis is the axis of rotation and the apex of which is on surface 82, as shown by exemplary output beams 88–91 in FIG. 6. Similarly to the system shown in FIGS. 2, 3, 4 and 5, the embodiment in FIG. 6 may be used as either a beam splitter or a beam combiner, or both at the same time. (Alternatively, to minimize the effect of wobble resulting from bearings for prism 82, surfaces 84 and 86 are equally and oppositely inclined to the rotation axis and the beams 80 are then deviated a minimum.) Other shapes than that described may be used for the refracting element 82, for example, a truncated lens, mounted so as to rotate about an axis displaced from the optical axis of the lens. The exemplary shapes for refracting element 82 are not to be construed as limitations, however, since many other shapes may be employed with advantage in the present invention.

It should be appreciated that modifications may be made to the preferred embodiments described hereinabove, without departing from the spirit of the present invention. Accordingly, the scope of the invention is to be limited only as indicated in the following claims.

What is claimed is:

1. A system for combining beams of pulsed radiation comprising:
   a plurality of pulsed radiation sources for providing spatially separate beams of radiation pulses in a time sequence;
   the radiation pulses having a finite time duration;
   the beams of radiation being inclined with respect to and distributed around a central axis so as to lie in a conical surface whose axis is the central axis;
   each of said beams of radiation being inclined from said axis by a predetermined angle which is a small fraction of a radian;
   means for receiving the sequence of spatially separate beams of radiation pulses at substantially their point of intersection with said central axis to deflect the separate beams of radiation pulses onto a common path over said finite time duration;
   said central axis and said common path being inclined to and therefor separate from each other.

2. The system of claim 1 wherein said predetermined angle is less than one degree.

3. The system of claim 1 wherein:
   each of said beams of radiation is characterized by having an angle of divergence and a predetermined time duration; and
   said means for receiving includes means for limiting the angular motion of said pulses directed along the common path over each pulse duration to be less than the angle of divergence thereof.

4. The system of claim 1 wherein the means for receiving comprises a reflecting surface.

5. The system of claim 4 wherein the receiving means causes an axis orthogonal to the reflecting surface to follow a conical surface angled about its axis by a small fraction of a radian.

6. The system of claim 5 wherein the means for receiving further comprises means for rotating the reflective surface.

7. The system of claim 6 wherein the apex of the conical distribution of beams lies generally in the plane of the reflective surface.

8. The system of claim 7 wherein the apex contacts the reflective surface at a point remote from the axis of rotation of the reflective surface.

9. The system of claim 7 wherein the radiation sources comprise pulsed lasers.

10. The system of claim 7 wherein the means for receiving further comprises means for synchronizing the rotation of the reflective surface with the radiation pulses from each of the pulsed radiation sources to reflect each received pulse along the common path.

11. The system of claim 10 wherein the pulsed radiation sources emit pulses sequentially in an order corresponding to the ordering of beams of pulsed radiation around the central axis.

12. The system of claim 11 wherein the reflecting surface rotates one revolution during a complete sequence of pulses from each of the pulsed radiation sources.

13. The system of claim 7 further comprising:
   a second plurality of pulsed radiation sources providing spatially separate beams of radiation pulses in a sequence;
   the radiation pulses from the second plurality of pulsed radiation sources having a finite time duration;
   the beams of radiation pulses from the second plurality of pulsed radiation sources being distributed around and inclined with respect to a second central axis and intersecting the second axis at substantially the same point, such that the beams of radiation from the second plurality of pulsed radiation sources lie generally in a second conical surface about the second axis;
   the means for receiving being operative to direct the separate beams of radiation from the second plurality of pulsed radiation sources along a second generally common path different from the first common path.

14. The system of claim 1 wherein the means for receiving comprises an optically transmissive refracting means having an index of refraction differing from that of the surrounding environment and positioned to receive the beams of pulsed radiation for deflecting the path of the beams of pulsed radiation to direct the separate beams of radiation pulses along the generally common path.

15. The system of claim 14 wherein the refracting means has first and second planar surfaces whose normals are inclined with respect to the common path at equal angles.

16. The system of claim 15 wherein the beams of pulsed radiation enter the refracting means at the second surface and leave the refracting means at the first surface thereof.

17. The system of claim 16 wherein the second surface is located substantially at the apex of the conical surface.

18. The system of claim 14 wherein the means for receiving further comprises means for rotating the refracting means about an axis of rotation.

19. The system of claim 18 wherein the axis of rotation is parallel to the common path.

20. The system of claim 14 wherein the means for receiving further comprises means for synchronizing the rotation of the refracting means with the radiation pulses coming from each of the pulsed radiation sources such that each pulse is directed along the common path by the refracting means.

21. The system of claim 20 wherein the pulsed radiation sources emit pulses substantially in the order that the radiation beam from each is arranged around said central axis.

22. The system of claim 21 wherein the refracting means rotates once for each complete sequence of pulses from the pulsed radiation sources.

23. The system of claim 22 wherein the beams of radiation pulses comprise pulses of collimated electromagnetic radiation.

24. The system of claim 20 wherein the sources of pulsed radiation comprise pulsed lasers.

25. The system of claim 1 wherein the means for receiving consists of a single reflecting surface.

26. The system of claim 25 wherein the reflecting surface is rotated about an axis inclined with respect to the normal to the reflecting surface.

27. Apparatus for combining a plurality of beams of pulsed radiation into a single beam of pulsed radiation and for splitting a single beam of pulsed radiation into a plurality of beams of pulsed radiation, comprising:

means for receiving a plurality of beams of pulsed radiation, the beams of pulsed radiation being distributed around and inclined by a small fraction of a radian with respect to a central axis and intersecting the central axis at substantially one point, such that the beams of radiation lie generally in a conical surface about the central axis, and for directing the separate beams of radiation pulses along a generally common path, said central axis and said common path being inclined to and therefor separate from each other;

the means for receiving being further operative to receive a single input beam of sequenced radiation pulses and to direct individual pulses thereof along a plurality of separate paths so as to provide spatially separate beams of radiation pulses, the separate paths being distributed around and inclined by a small fraction of a radian with respect to an output axis and emanating from substantially one point thereon so that the resulting plurality of beams of radiation lie generally in a conical surface whose axis is the output axis, said output axis and the path of said single beam being inclined to and therefor separate from each other.

28. The apparatus of claim 27 wherein the means for receiving further comprises:
a reflecting surface; and
means for rotating the reflective surface about an axis inclined with respect to the normal to the reflecting surface such that the normal traces a cone;
the intersection of the axis of rotation and the reflective surface being located substantially at the apexes of the conical distributions of beams.

29. The apparatus of claim 27 wherein the means for receiving comprises:
an optically transmissive refracting means having an index of refraction differing from that of the surrounding environment and operative for deflecting the beams of pulsed radiation; and
means for rotating the refracting means about an axis parallel with the common path.

30. In a system having a repeating sequence of time points each defining a time of occurrence of a radiation pulse in a sequence of radiation pulses each of a finite time duration, a dynamic optical system for providing an angular transformation of said sequence of radiation pulses between a first axis defining a common path of positionally superimposed radiation pulses and a plurality of spatially separate radiation paths each inclined to a central axis and distributed about said central axis, said system comprising:
an optical element having at least one surface for providing radiation deflection;
said surface being positioned to intersect said first axis and said central axis;
means for cylically varying the angle at which said surface of said element intersects said first axis by a bounded angle which is a small fraction of a radian to maintain the transformation between said common path and the corresponding spatially separate path during the finite time duration;
said central axis and said common path being inclined to and therefor separate from each other;
means for defining said sequence of time points;
said cylically varying means including means for synchronizing the cylical variation in the intersection angle of said surface to provide a predetermined angle of intersection for said surface for each of said time points in said sequence of said time points.

31. The dynamic optical system of claim 30 wherein said optical element includes a mirror.

32. The dynamic optical system of claim 31 wherein said optical element includes a refractive element.

33. The dynamic optical system of claim 30 wherein said means for cyclically varying includes means for rotating said optical element.

34. The dynamic optical system of claim 30 wherein said bounded angle is no more than one degree.

35. The dynamic optical system of claim 30 further including:
means for generating a plurality of time-sequenced radiation pulses directed along said plurality of spatially separate radiation paths toward said optical element for combining into a plurality of radiation pulses of augmented pulse rate along said common path.

36. A system for combining beams of pulsed radiation comprising:
a plurality of pulsed radiation sources for providing spatially separate beams of radiation pulses in a time sequence;
the radiation pulses having a finite time duration;
the beams of radiation being inclined with respect to and distributed around a central axis so as to lie in a conical surface whose axis is the central axis;
each of said beams of radiation being inclined from said axis by a predetermined angle which is a small fraction of a radian;
means for receiving the sequence of spatially separate beams of radiation pulses at substantially their point of intersection with said central axis to deflect the separate beams of radiation pulses onto a common path over said finite time duration;
each of said beams of radiation being characterized by having an angle of divergence and a predetermined time duration; and
said means for receiving including means for limiting the angular motion of said pulses directed along the common path over each pulse duration to be less than the angle of divergence thereof.

37. A system for combining beams of pulsed radiation comprising:
a plurality of pulsed radiation sources for providing spatially separate beams of radiation pulses in a time sequence;
the radiation pulses having a finite time duration;
the beams of radiation being inclined with respect to and distributed around a central axis so as to lie in a conical surface whose axis is the central axis;
each of said beams of radiation being inclined from said axis by a predetermined angle which is a small fraction of a radian;
means for receiving the sequence of spatially separate beams of radiation pulses at substantially their point of intersection with said central axis to deflect the separate beams of radiation pulses onto a common path over said finite time duration;
said means for receiving comprising a rotating reflecting surface causing an axis orthogonal to the reflecting surface to follow a conical surface angled about its axis by a small fraction of a radian;
the apex of the conical distribution of beams lying generally in the plane of the reflective surface and contacting the reflective surface at a point remote from the axis of rotation of the reflective surface.

* * * * *

UNITED STATES PATENT AND TRADEMARK OFFICE
CERTIFICATE OF CORRECTION

PATENT NO. : 4,283,116
DATED : August 11, 1981
INVENTOR(S) : John A. Weis

It is certified that error appears in the above—identified patent and that said Letters Patent is hereby corrected as shown below:

| | | |
|---|---|---|
| Column 2, | line 37, | "FIG. 3 shows schematically an alternate application of the invention for combining several beams into a single beam;" |
| | | should read |
| | | --FIG 2A shows schematically an alternative to FIGS. 2 or 3; |
| | | FIG. 3 shows schematically an alternate application of the invention for combining several beams into a single beam;-- |
| Column 4, | line 56, | "surface 32 low. The" should read --surface 32 low. This is illustrated in FIG. 2A where primes are used to designate the elements corresponding of FIGS. 2 or 3. The--. |
| Column 6, | line 51, | "surface 82, as" should read --surface 86, as--. |

Signed and Sealed this

Eighth Day of December 1981

[SEAL]

Attest:

Attesting Officer

GERALD J. MOSSINGHOFF
Commissioner of Patents and Trademarks